United States Patent [19]
Kempf et al.

[11] Patent Number: 5,807,117
[45] Date of Patent: Sep. 15, 1998

[54] PRINTED CIRCUIT BOARD TO HOUSING INTERCONNECT SYSTEM

[75] Inventors: Andrew J. Kempf, Horseheads; Jason Perry; Ronald P. Locati, both of Elmira, all of N.Y.

[73] Assignee: Augat Inc., Horseheads, N.Y.

[21] Appl. No.: 680,483

[22] Filed: Jul. 15, 1996

[51] Int. Cl.⁶ .................................................. H01R 9/09
[52] U.S. Cl. .......................................................... 439/63
[58] Field of Search .......................... 439/63, 581, 675, 439/578, 609, 827

[56] References Cited

U.S. PATENT DOCUMENTS

| | | | |
|---|---|---|---|
| 3,715,708 | 2/1973 | Lloyd et al. | 439/675 |
| 3,753,206 | 8/1973 | Busuttil et al. | 439/194 |
| 3,965,426 | 6/1976 | Ringland | 325/375 |
| 4,061,989 | 12/1977 | Petrelis | 333/7 R |
| 4,152,666 | 5/1979 | Kajikawa et al. | 330/277 |
| 4,214,214 | 7/1980 | Merriman | 330/65 |
| 4,397,035 | 8/1983 | Nothnagel et al. | 455/90 |
| 4,426,127 | 1/1984 | Kubota | 439/609 |
| 4,470,657 | 9/1984 | Deacon | 439/609 |
| 4,518,217 | 5/1985 | Corrigan, III | 439/668 |
| 4,557,292 | 12/1985 | Nicolas et al. | 137/596.16 |
| 4,714,959 | 12/1987 | Pshtissky | 358/184 |
| 4,781,607 | 11/1988 | Rumbaugh | 439/827 |
| 4,853,650 | 8/1989 | Bowling et al. | 330/287 |
| 4,864,632 | 9/1989 | Moriyama et al. | 455/3.1 |
| 4,929,188 | 5/1990 | Lionetto et al. | 439/827 |
| 4,941,048 | 7/1990 | Hartson et al. | 358/181 |
| 5,053,910 | 10/1991 | Goldstein | 361/111 |
| 5,154,637 | 10/1992 | Klug et al. | 439/585 |
| 5,166,477 | 11/1992 | Perin, Jr. et al. | 439/578 |
| 5,268,632 | 12/1993 | Topping | 324/71.1 |
| 5,369,803 | 11/1994 | Kirasawa et al. | 455/89 |
| 5,485,630 | 1/1996 | Lee et al. | 455/4.1 |
| 5,489,888 | 2/1996 | Jagiella et al. | 340/537 |

*Primary Examiner*—Gary F. Paumen
*Assistant Examiner*—Barry M. L. Standig
*Attorney, Agent, or Firm*—Weingarten, Schurgin, Gagnebin & Hayes LLP

[57] ABSTRACT

A printed circuit board to housing interconnect system capable of withstanding "hot" connects and disconnects of conductors carrying currents of up to 15 amperes or more while maintaining RF performance. The interconnect system may be used to couple power lines or RF signal lines from a printed circuit board to a high power system. The interconnect system allows a printed circuit board to be installed or removed from a system without having to power down the system in order to perform installation or removal.

14 Claims, 6 Drawing Sheets

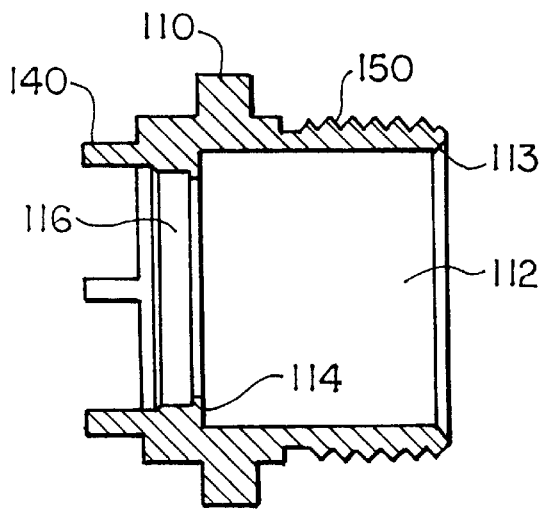
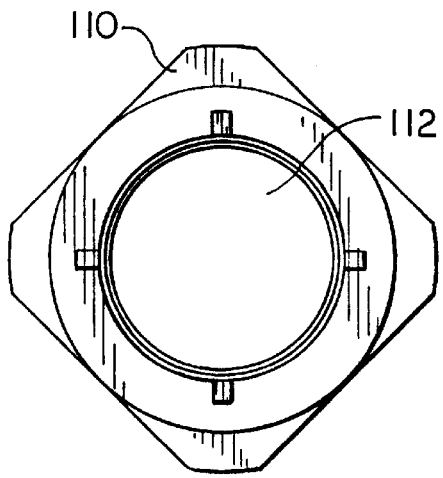
FIG. 3        FIG. 3A
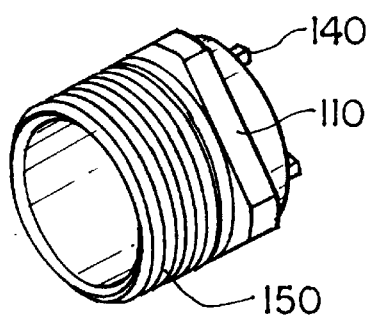
FIG. 3B
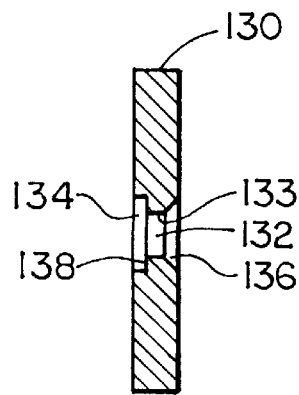
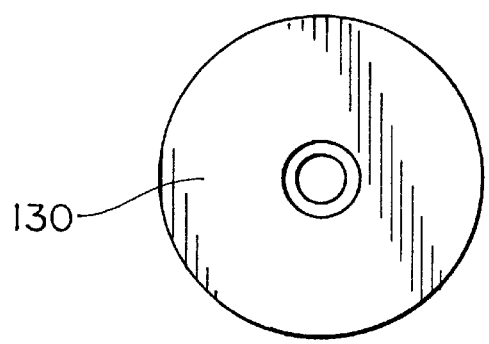
FIG. 4        FIG. 4A

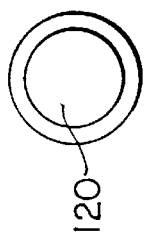
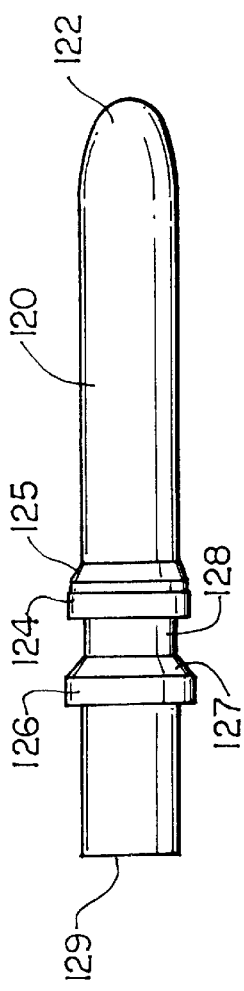
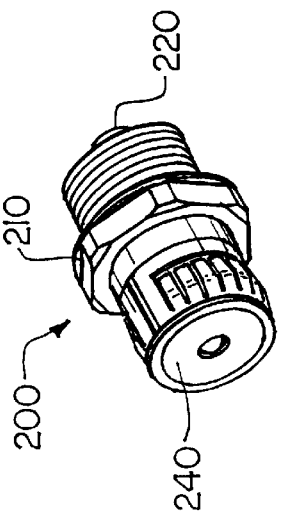
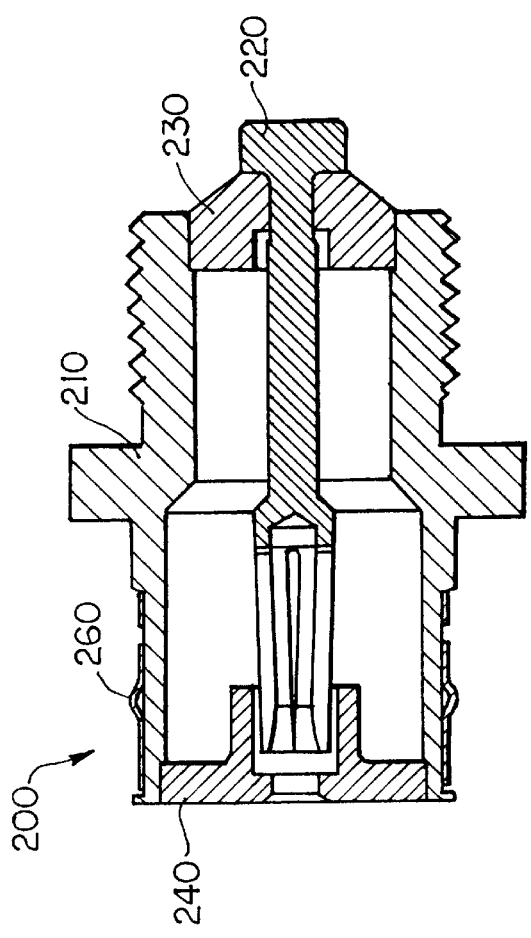

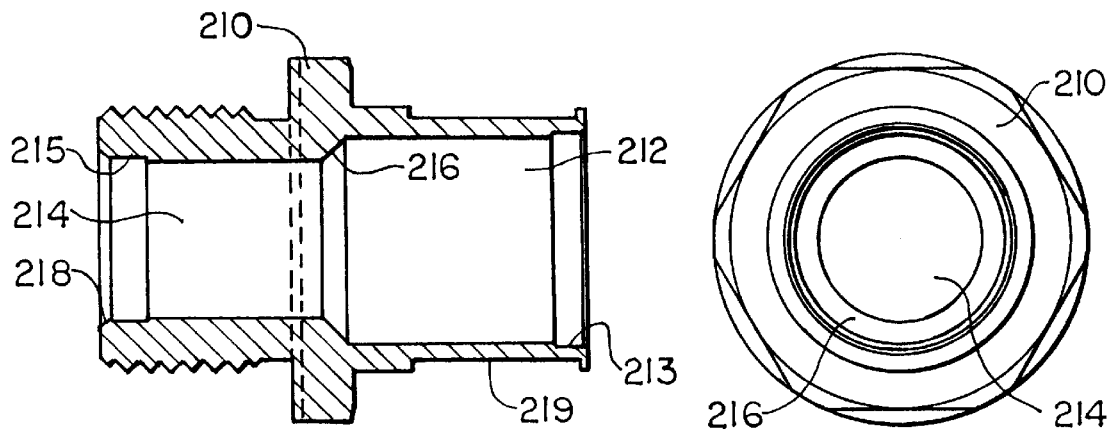
FIG. 7
FIG. 7A
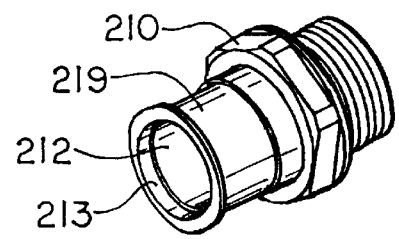
FIG. 7B
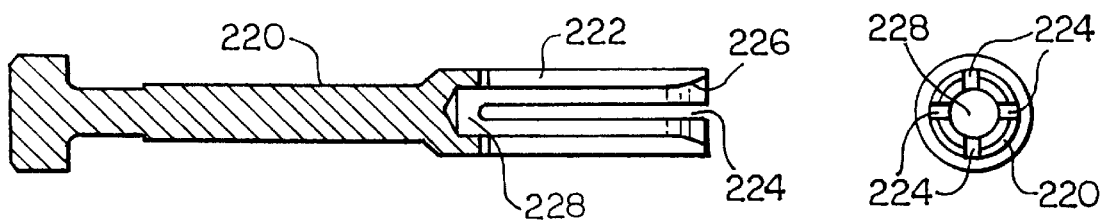
FIG. 8
FIG. 8A

1

PRINTED CIRCUIT BOARD TO HOUSING INTERCONNECT SYSTEM

FIELD OF THE INVENTION

The present invention relates generally to electrical connectors and more particularly to connectors that can be used to connect and disconnect devices with at least one of the devices in a powered on state.

BACKGROUND OF THE INVENTION

Connectors which interconnect conductors from a printed circuit board to a system while maintaining the system in a powered on state are known. These prior art connectors typically allow for disconnection and removal of a printed circuit board from a system or connection and installation of a printed circuit board to a system with the system power remaining on as long as the connector is not subjected to a current of more than three amperes. For systems which have larger current values, such as systems including relatively high power cable television distribution amplifiers, known in the art as Super Distribution Amplifiers, the connectors cannot withstand the high current during disconnection or connection operations. Arcing, carbon buildup and deformation of the terminals of the connector may result which can affect the integrity of the connection and cause RF signal loss. Accordingly, the systems must be powered off in order to remove or install printed circuit boards to the system, or a plurality of connectors must be used to interconnect the signal from the printed circuit board to the system, with caution being exercised to insure that all of the plurality of connectors connect or disconnect at the same time so that all the current is not provided through a single connector.

SUMMARY OF THE INVENTION

A printed circuit board to housing interconnect system is provided that is capable of withstanding a current of up to 15 amperes or more during mating or unmating of the interconnect system while maintaining RF performance. The interconnect system includes a printed circuit board (PCB) connector assembly which is typically installed on a printed circuit board, and a housing connector assembly which is typically installed on a module in a system. The housing connector assembly is configured to receive the PCB connector assembly and the combination of the PCB connector assembly and the housing connector assembly provide for connection or removal of a printed circuit board to a system without the need to first power the system down. The PCB connector terminal is a solid pin which is sized to handle the high currents. The housing connector terminal is also sized to handle the high current. Additionally, a conductive spring is utilized to provide a common conduction path between the bodies of the PCB connector assembly and housing connector assembly, thereby helping the PCB to housing interconnect system maintain RF signal integrity.

BRIEF DESCRIPTION OF THE DRAWINGS

The invention will be more fully understood from the following detailed description taken in conjunction with the accompanying drawings in which:

FIG. 3 is a cross-sectional view of a PCB connector body;

FIG. 3A is an end view of the PCB connector body of FIG. 3;

FIG. 3B is an isometric view of the PCB connector body of FIG. 3;

FIG. 4 is a cross-sectional side view of a first insulator;

FIG. 4A is an end view of the first insulator of FIG. 4;

FIG. 5 is a side view of a male terminal;

FIG. 5A is an end view of the male terminal of FIG. 5;

FIG. 6 is a cross-sectional side view of a housing connector;

FIG. 6A is an isometric view of the housing connector of FIG. 6;

FIG. 7 is a cross-sectional side view of a housing connector body;

FIG. 7A is an end view of the housing connector body of FIG. 7;

FIG. 7B is an isometric view of the housing connector body of FIG. 7;

FIG. 8 is a cross-sectional side view of a female terminal;

FIG. 8A is an end view of the female terminal of FIG. 8;

DETAILED DESCRIPTION OF THE DRAWINGS

Figure 1:
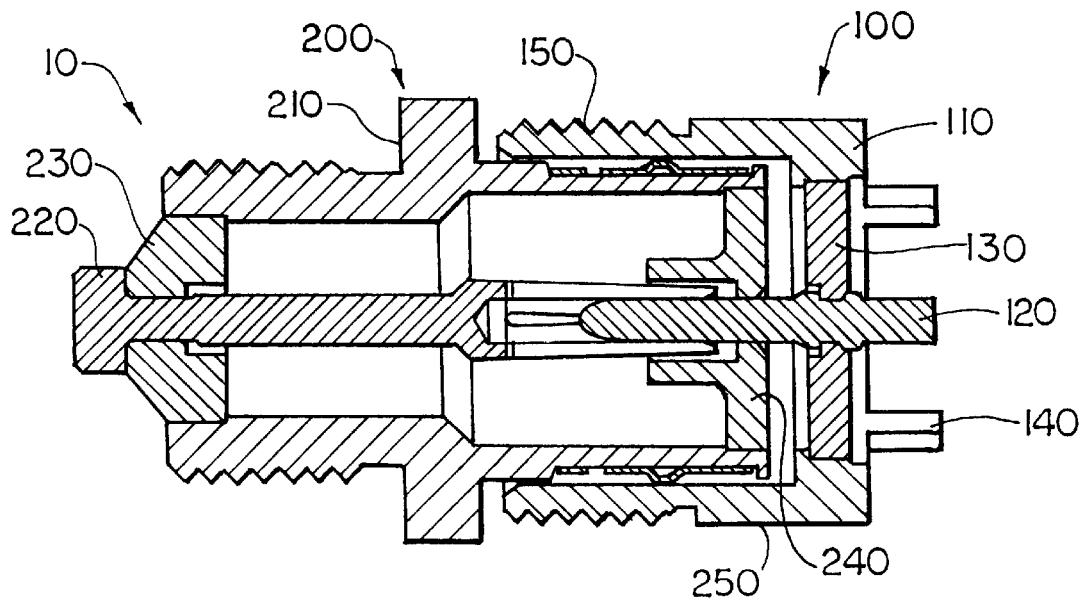
FIG. 1 is a cross-sectional diagram of the printed circuit board to housing interconnect system of the present invention.

FIG. 1 shows a printed circuit board to housing interconnect system 10 according to the present invention. The interconnect system 10 includes a PCB connector assembly 100 and a housing connector assembly 200 which can be mated and unmated to provide for connection and disconnection of conductors which conduct signals carrying up to 15 amperes of current or more while maintaining RF performance.

Figure 2:
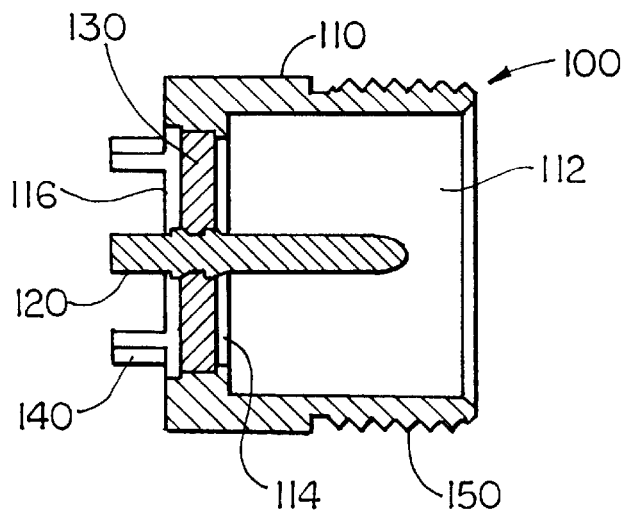
FIG. 2 is a cross-sectional diagram of a PCB connector.
Figure 2A:
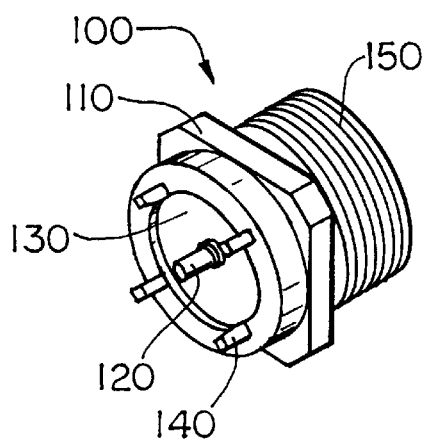
FIG. 2A is an isometric view of the PCB connector of FIG. 2.

The PCB connector assembly 100, shown in FIGS. 2 and 2A includes a PCB connector body 110 having a first insulator 130 disposed within a first end thereof. A male terminal 120 is fitted within a central bore of the first insulator 130. The PCB connector body 110 may also include threads 150 disposed about an outside surface adjacent the second end of the connector body 110 which may be used to mount the PCB connector assembly 100 to a module casting (not shown). A plurality of mounting legs 140 may also be included as part of PCB connector body 110. Mounting legs 140 provide a conduction path from a printed circuit board to the PCB connector body 110.

Referring now to FIGS. 3, 3A and 3B, the PCB connector body 110 is shown to include a first bore 112 at a second end thereof. First bore 112 extends a predetermined distance into the second end of the PCB connector body 110. A tapered edge 113 is provided about an end of first bore 112 adjacent a second end of the PCB connector body 110. Tapered edge 113 aids in alignment and reception of a housing connector body within the PCB connector body 110. First bore 112 is configured to receive a portion of the housing connector body, as will be described later. A second bore 116 extends from a first end of the PCB connector body 110 into first bore 112. Second bore 116 is of a smaller diameter than first bore 112, thereby providing an annular shoulder 114. Second bore 116 is configured to receive a first insulator 130.

A first insulator 130, shown in FIGS. 4 and 4A is configured to fit into the second bore 116 of the PCB connector 110. First insulator 130 also includes a first bore 134 extending from a first end of the first insulator 130. A second bore 132 extends from a second end of first insulator 130 into first bore 134 and provides for an annular shoulder 138. A flared opening 136 is provided at the end of second bore 132 adjacent the second end of insulator 130.

Referring now to FIGS. 5 and 5A a male terminal 120 is shown. Male terminal 120 is sized to conduct a signal having a current of up to 15 amperes or more. In this embodiment male terminal 120 comprises a solid cylindrical body having a rounded first end 122. Alternate embodiments could include other shapes of male terminals as are known in the art. Male terminal 120 further includes a first annular ridge 124, which includes a tapered front edge 125. A second annular ridge 126 is provided, which also includes a tapered front edge 127. The section of body 128 between the annular ridges is sized to be received within a section 133 of first insulator 130. Male terminal 120 is configured to fit inside the bores 132 and 134 of first insulator 130 such that first annular ridge 124 fits into first bore 134 abutting annular shoulder 138. Section 128 of male terminal 120 is held in an abutting engagement with section 133 of second bore 132, and with the tapered edge 136 of second bore 132 abutting tapered edge 127 of the second annular ridge 126. With such an arrangement the male terminal is positioned within first insulator 130 and PCB connector body 110 while being electrically insulated from PCB connector body 110.

FIGS. 6 and 6A show housing connector assembly 200. Housing connector assembly 200 includes a housing connector body 210 having a second insulator 230 disposed along a common longitudinal axis as the connector body with a section of second insulator 230 disposed within a second end of housing connector body 210. Third insulator 240 is disposed along a common longitudinal axis as the housing connector body 210 and located internally adjacent a first end thereof. A first end of a female terminal 220 is disposed within second bore 246 of third insulator 240. The body of the female terminal 220 extends through second insulator 230, with a second end of the female terminal 220 externally adjacent the second end of the second insulator 230.

FIGS. 7, 7A and 7B show housing connector body 210. A first bore 214 extends from a second end of housing connector body 210 and includes a tapered end 218 adjacent the second end of housing connector body 210. A second bore 215 extends from the second end of housing connector body a short distance into the body 210. Second bore 215 is sized to receive a second insulator 230 therein. A third bore 212 extends from a first end of housing connector body 210 into first bore 214. Third bore 212 includes a tapered end 216. A fourth bore 213 extends a short distance from the first end of the connector body 210 and is configured to receive a third insulator 240. Housing connector body 210 may also include an annular groove 219 about the exterior surface adjacent the first end of the connector body 210. Annular groove 219 is configured to receive an annular spring 250. The exterior surface adjacent the second end of the connector body 210 also includes threads 150 for mounting the housing connector assembly 200 to a housing casting in a system.

Referring now to FIGS. 8 and 8A a female terminal 220 is shown. Female terminal 220 is sized to conduct a signal having a current of 15 amperes or more. While a particular style female terminal 220 is described, it should be appreciated that any style female terminal as is known in the art could be utilized. A bore 228, configured to engageably receive a portion of male terminal 120 therein, is disposed within a first end of female terminal 220. The second end of female terminal 220 is solid. A plurality of slots 224 are disposed adjacent bore 228 and provide for the first end of terminal 220 to include a plurality of fingers 222. Fingers 222 include tapered ends 226 to aid in alignment and reception of a portion of male terminal 120 within female terminal 220.

Figure 9:
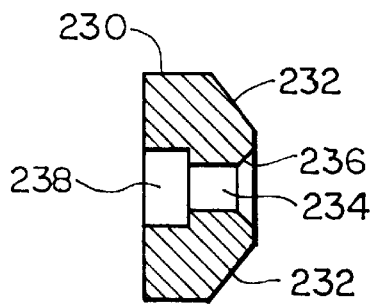
FIG. 9 is a cross-sectional side view of a second insulator.
Figure 9A:
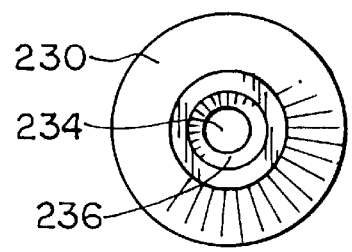
FIG. 9A is an end view of the second insulator of FIG. 9.

Referring now to FIGS. 9 and 9A, second insulator 230 is shown. A first bore 234 extends from a second end of the second insulator 230. First bore 234 includes a tapered end 236. A second bore 238 is provided at the first end of the second insulator 230 and extends into first bore 234. Second insulator 230 includes a beveled edge 232 at the second end of the insulator 230.

Figure 10:
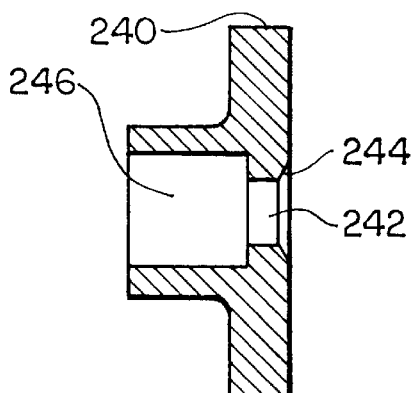
FIG. 10 is a cross-sectional side view of a third insulator.
Figure 10A:
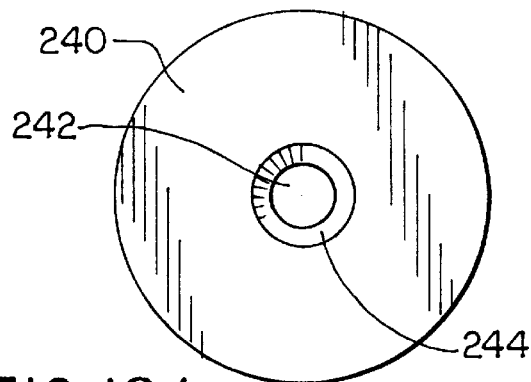
FIG. 10A is an end view of the third insulator of FIG. 10.

FIGS. 10 and 10A show third insulator 240. A first bore 242 extends into the third insulator 240 from a first end thereof. First bore 242 is sized to allow a portion of male terminal 120 to pass therethrough when PCB connector assembly 100 is mated with housing connector assembly 200. A tapered edge 244 is provided at the end of first bore 242 adjacent the first end of third insulator 240 to aid in alignment and reception of male terminal 120 therethrough. A second bore 246 extends from a second end of insulator 240 and extend into first bore 242. Second bore 246 is configured to receive the first end of female terminal 220 therein.

Figure 11:
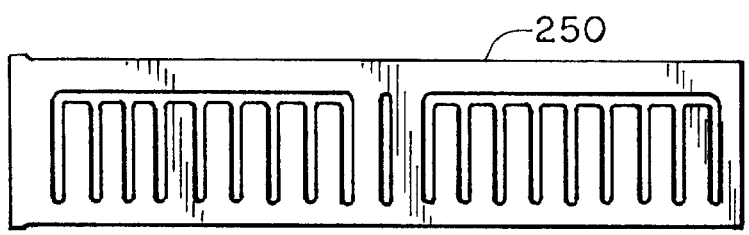
FIG. 11 is a view of a spring before it is annularly formed.
Figure 11A:
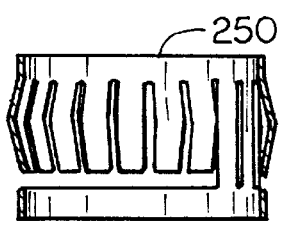
FIG. 11A is a side view of the spring of FIG. 11 after it has been annularly formed.
Figure 11B:
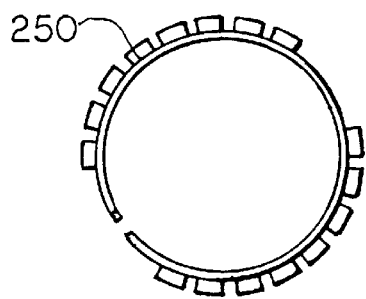
FIG. 11B is an end view of the spring of FIG. 11A.
Figure 11C:
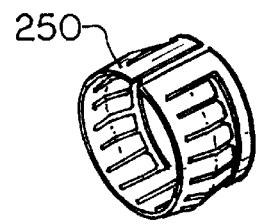
FIG. 11C is an isometric view of the spring of FIG. 11A.

FIGS. 11–11C show an annular spring 250. The annular spring 250 is comprised of a conductive material, such as beryllium copper. The spring is configured to fit around housing connector body 210 and provides a conduction path between the housing connector body 210 and PCB connector body 110. The conduction path provided by annular spring 250 is such that this conduction path is provided before the connection of the male terminal 120 with the female terminal 220 during insertion of the PCB connector assembly 100 into housing connector assembly 200, and also the connection provided by annular spring 250 is broken after the connection between the male terminal 120 and the female terminal 220 is broken during removal of the PCB connector assembly 100 from the housing connector assembly 200. Accordingly, the connection made by the spring 250, typically a ground connection, is made first during insertion, and broken last on disconnection which minimizes arcing between the male terminal 120 and female terminal 220.

Figure 12:
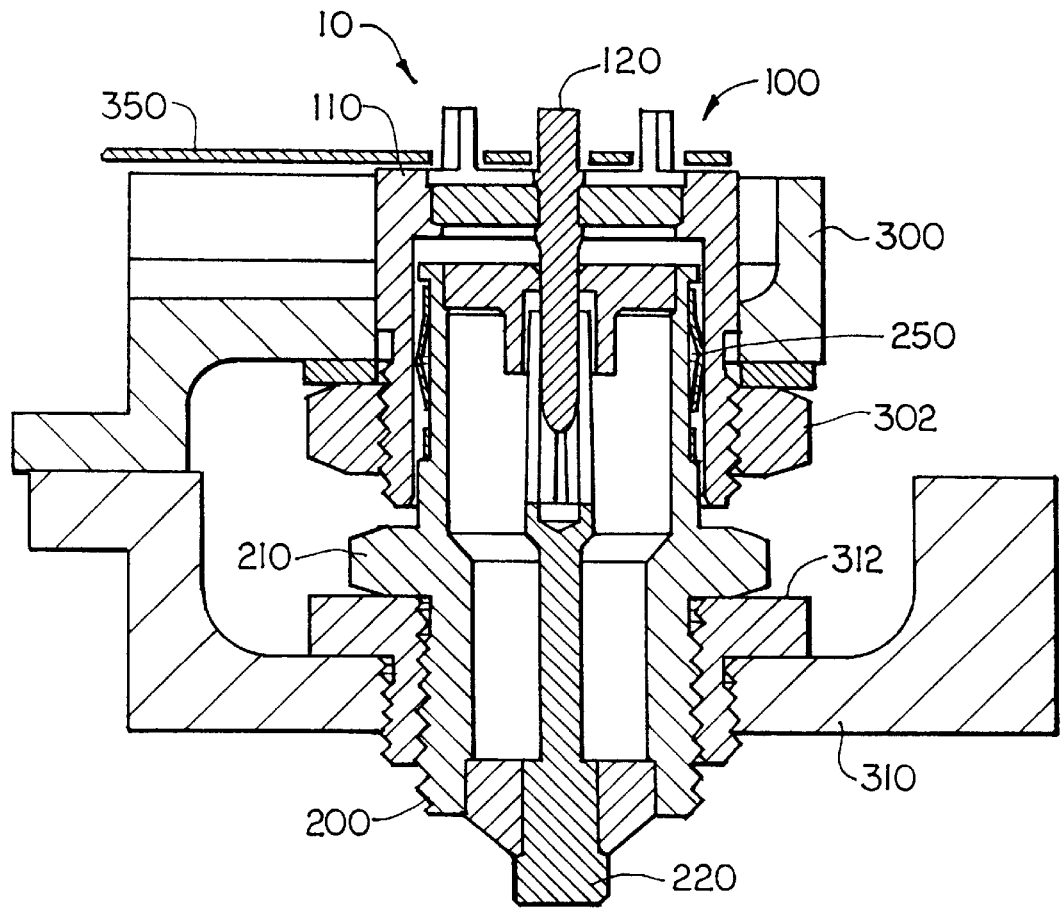
FIG. 12 is a cross-sectional diagram of the printed circuit board to housing interconnect system installed in a system.
Figure 12A:
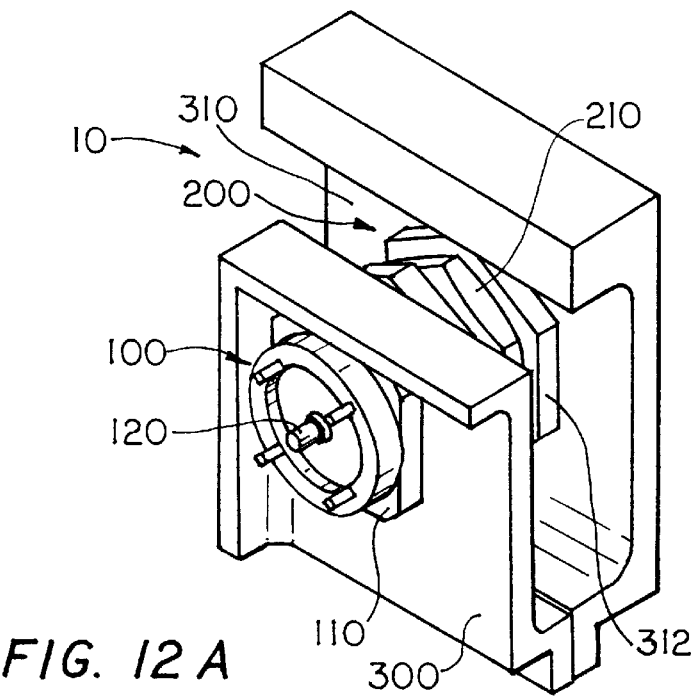
FIG. 12A is an isometric diagram of the printed circuit board to housing interconnect system installed in a system.

FIGS. 12 and 12A show a PCB connector assembly 100 mounted to a module casting 300 of a printed circuit board 350 by way off mounting hardware 302. Also shown is a housing connector assembly 200 mounted by way of a mounting insert 312 within a housing casting 310 of a system. The printed circuit board 350 is in electrical communication with a module of the system via the male terminal 120 of PCB connector assembly 100 being received into the female terminal 220 of housing connector assembly 200. Additionally, PCB connector body 110 is in electrical communication with housing connector body 210 via conductive annular spring 250. In such a manner the printed circuit board 350 can be removed from or installed to the module of the system while maintaining power to the system. Additionally there is no degradation of RF signal characteristics.

For safety considerations it is preferable to have the male terminal and its associated connector mounted to the printed circuit board, and the female terminal and its associated housing connector mounted to the housing. Accordingly, when the interconnect system undergoes a live disconnect, the live terminal is the female terminal and nothing can accidentally come into contact with the live terminal.

The printed circuit board to housing interconnect system can be used with existing designs with minimal modifications to the existing printed circuit board and module casting. The only modifications necessary are to enlarge the hole in the printed circuit board to accept the larger male terminal and enlarge the hole in the module casting through which the PCB connector assembly fits.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

We claim:

1. A printed circuit board to housing interconnect system capable of withstanding high current during mating or unmating of said interconnect system comprising:

a PCB connector assembly comprising:
 a PCB connector body open on each of a first end and a second end and having a central bore disposed therethrough;
 a first insulator having a central bore disposed therethrough, said first insulator disposed along a common longitudinal axis within said PCB connector body; and
 a male terminal comprising a solid pin of conductive material disposed along a common longitudinal axis and extending from the first end of said PCB connector body, through the central bore of said first insulator and into the central bore of said PCB connector body, said male terminal sized to interconnect and continuously conduct a current of up to approximately fifteen amperes; and a housing connector assembly comprising:
 a housing connector body open on each of a first end and a second end and having a central bore disposed therethrough;
 a second insulator having a central bore disposed therethrough, said second insulator disposed along a common longitudinal axis within said housing connector body; and
 a female terminal having a solid first end and a second end, said female terminal disposed along a common longitudinal axis within said housing connector body such that the first end of said female terminal is adjacent the first end of said housing connector body, the second end of said female terminal extends towards a second end of said housing connector body, said second end of said female terminal having a central bore disposed therein, the central bore of said female terminal sized to receive a portion of said male terminal, said female terminal sized to interconnect and continuously conduct a current of up to approximately fifteen amperes.

2. The printed circuit board to housing interconnect system of claim 1 wherein said housing connector further comprises a third insulator having a central bore disposed therethrough, said third insulator disposed along a common longitudinal axis within a first end of said housing connector body.

3. The printed circuit board to housing interconnect system of claim 1 wherein said housing body connector further comprises an annular spring disposed about an exterior surface adjacent a first end of said housing connector body.

4. The printed circuit board to housing interconnect system of claim 3 wherein said annular spring is electrically conductive.

5. The printed circuit board to housing interconnect system of claim 3 wherein said annular spring provides a conduction path from said PCB connector body to said housing connector body when the first end of said housing connector body is inserted into the second end of said PCB connector body.

6. The printed circuit board to housing interconnect system of claim 5 wherein said spring is configured to provide the conduction path from said PCB connector body to said housing connector body before a connection is provided between said male terminal and said female terminal when said PCB connector body is inserted within said housing connector body.

7. The printed circuit board to housing interconnect system of claim 5 wherein said spring is configured to break the conduction path from said PCB connector body to said housing connector body after the connection is broken between the said male terminal and said female terminal when said PCB connector body is removed from said housing connector body.

8. The printed circuit board to housing interconnect system of claim 1 wherein said PCB connector body further comprises a mounting leg.

9. The printed circuit board to housing interconnect system of claim 8 wherein said mounting leg provides for a conduction path between said PCB connector body and a printed circuit board.

10. The printed circuit board to housing interconnect system of claim 1 wherein said male terminal and said female terminal are connected to respective power conductors.

11. The printed circuit board to housing interconnect system of claim 1 wherein said male terminal and said female terminal are connected to respective RF signal conductors.

12. The printed circuit board to housing interconnect system of claim 1 wherein said PCB connector body further comprises threads disposed about an outside surface thereof, said threads adjacent the second end of said PCB connector body.

13. The printed circuit board to housing interconnect system of claim 1 wherein said housing connector body further comprises threads disposed about an outside surface thereof, said threads adjacent the second end of said housing connector body.

14. The printed circuit board to housing interconnect system of claim 1 wherein said PCB connector is installed on a housing of a printed circuit board and said housing connector is installed on a housing of a module.

* * * * *